United States Patent [19]
Rothe

[11] 4,240,043
[45] Dec. 16, 1980

[54] TRANSVERSE-LONGITUDINAL SEQUENTIAL DISCHARGE EXCITATION OF HIGH-PRESSURE LASER

[75] Inventor: Dietmar E. Rothe, Rancho Palos Verdes, Calif.

[73] Assignee: Northrop Corporation, Hawthorne, Calif.

[21] Appl. No.: 967,409

[22] Filed: Dec. 7, 1978

[51] Int. Cl.³ .............................................. H01S 3/097
[52] U.S. Cl. ........................ 331/94.5 PE; 331/94.5 D
[58] Field of Search ............... 331/94.5 PE, 94.5 D, 331/94.5 G; 330/4.3; 313/198

[56] References Cited

U.S. PATENT DOCUMENTS

| | | | |
|---|---|---|---|
| 3,662,284 | 5/1972 | Beaulieu et al. | 331/94.5 PE |
| 4,010,397 | 3/1977 | Hon | 313/94.5 PE X |
| 4,075,537 | 2/1978 | Quillfeldt | 313/198 X |
| 4,088,965 | 5/1978 | Lauderslager | 331/94.5 PE |
| 4,112,391 | 9/1978 | Godard | 331/94.5 PE |

OTHER PUBLICATIONS

A. K. Laflamme, "Double Discharge Excitation for Atmospheric Pressure CO2 Lasers", *The Review of Scientific Instruments,* vol. 41, pp. 1578–1581, Nov. 1970.

*Primary Examiner*—James W. Davie
*Attorney, Agent, or Firm*—Willard M. Graham

[57] ABSTRACT

An electrically excited gas laser having a dual-purpose electrode configuration. Two long parallel metal electrodes on opposite sides of the gas volume are almost totally enclosed in a dielectric body material. A raised projection of each electrode, at opposite body ends, is in direct contact with the laser gas. A conventional pulse generator is connected to the electrodes. When a pump pulse is applied, a transverse glow discharge is initiated which rapidly gives way to a main longitudinal discharge. In an alternate arrangement, the electrodes comprise several discharge sections in series along the laser body, connected in electrical parallel to the pulse generator.

9 Claims, 3 Drawing Figures

TRANSVERSE-LONGITUDINAL SEQUENTIAL DISCHARGE EXCITATION OF HIGH-PRESSURE LASER

BACKGROUND OF THE INVENTION

1. Field of the Invention

The present invention relates to lasers, and more particularly, to a new means and method for exciting an electric discharge in gas lasers, especially high-power gas lasers.

Electric glow discharges in superatmospheric high-power gas lasers (such as the rare-gas halide lasers) are basically unstable and can only be initiated by providing a uniform predischarge field and a uniform preionization level in the gas. Then when established, a distributed glow can be maintained for only short periods, generally a small fraction of a microsecond, particularly in gas mixtures containing electro-negative species such as $F_2$, $O_2$, $NF_3$, $SF_6$, and $HCl$, for example. The glow phase is terminated by the development of cathode streamers which later coalesce into one or more bright arcs. During the transition phase, streamers and glow may coexist, and effective laser excitation take place, provided the streamers do not extend over the entire cathode-to-anode gap and the discharge impedance has not collapsed to a very low value as a result. When the discharge impedance becomes very small due to arcs or streamers, the electrical energy oscillates rapidly between the circuit inductance and capacitance with practically no power dissipation in the laser gas.

Therefore, efficient excitation of the gain medium occurs only during a very short transition phase of the discharge, and this is believed to be the main reason for the low efficiencies (around 1%) observed with self-sustained rare-gas halide lasers using a conventional TE-laser geometry. Best efficiencies have been achieved with lasers having fast discharge networks with low impedance.

The usual TE-laser geometry results in a large cross-sectional discharge area and a short discharge gap length, thus giving a low-resistance positive column across the gap from cathode to anode. In scaling up to larger sizes, the impedance matching problem tends to worsen.

It is therefore an object of the present invention to provide a laser excitation scheme where an electric discharge in the laser gas is stable over a much longer time period than heretofore attainable. A further object is to provide such a gas laser excitation with only a single laser excitation power pulse, i.e., without separate preionization circuitry or the like. Ancillary objects are to provide an excitation system having much greater electric discharge efficiency than before and wherein the discharge impedance is many times greater than previously.

2. Description of the Prior Art

The usual TE-laser geometry features two relatively large flat electrodes in the laser gas volume spaced on opposite sides of the optical cavity center-line, transversely of the longitudinal direction of the beam. This is illustrated in FIG. 1 of U.S. Pat. No. 3,662,284, for example. Further, this same patent discloses using a corona-type discharge between an auxillary electrode and a main electrode to provide electrons and ultraviolet radiation for preionizing a high-pressure gas mixture in the main discharge gap of a transverse discharge laser prior to initiation of the main discharge.

The above-cited patent and an article titled "Doubled Discharge Excitation for Atmospheric Pressure Carbon Dioxide Lasers," The Review of Scientific Instruments, Vol. 41, pp. 1578–1581, Nov. 1970, employ a so-called "frustrated" discharge through a dielectric in conjunction with a separate predischarge circuit.

The principle of triggering a longitudinal glow discharge by localized corona discharges through a dielectric wall is described in U.S. Pat. Nos. 4,010,397 and 4,075,537. These techniques apply specifically to promote easy discharge initiation in flashlamps containing xenon at low or only moderately high pressures.

While it is possible that more pertinent prior arts exist, Applicant's search is believed to have been conducted with a conscientious effort to locate and evaluate the most relevant art available at the time, but this statement is not to be construed as a representation that no more pertinent art exists.

SUMMARY OF THE INVENTION

Briefly as to method, my invention comprises initiating a transverse glow discharge across the gas laser oscillator cavity through a dielectric wall until the dielectric barrier is substantially charged up, followed by automatically initiating or establishing a longitudinal glow discharge between longitudinally spaced electrodes in gas contact when the gas becomes sufficiently ionized by the transverse discharge. The method is performed with a single pump pulse operating with only a single circuit across two electrodes. Of course, the method can be repeated as is normal for continued pulsed operation.

Briefly as to apparatus, my invention comprises a dielectric laser chamber having two extended electrodes spaced substantially opposite each other on opposite sides of the optical center-line, the electrodes being embedded in the dielectric material on all sides except for a small end portion of each electrode, these end portions being near opposite respective ends of the chamber and exposed to the gas space within the laser cavity. The electrode end portions are adapted to sustain a longitudinal glow discharge in the entire gas volume between them.

A substantially conventional high-voltage pulse generator is provided externally across the electrodes. The necessary end mirrors are provided to form the space for generating the laser beam.

This structure thus enables a short transverse preionization discharge to be formed between the dielectric surfaces between the relatively long electrodes, followed immediately by a longitudinal main discharge between the completely exposes electrode end portions only. Improved efficiency high-power lasers are the result.

If it is desired to increase the gain length without unduly increasing the applied high voltage, this is accomplished by arranging several longitudinal discharge sections in series optically but in parallel electrically.

DESCRIPTION OF PREFERRED EMBODIMENT

Figure 1:
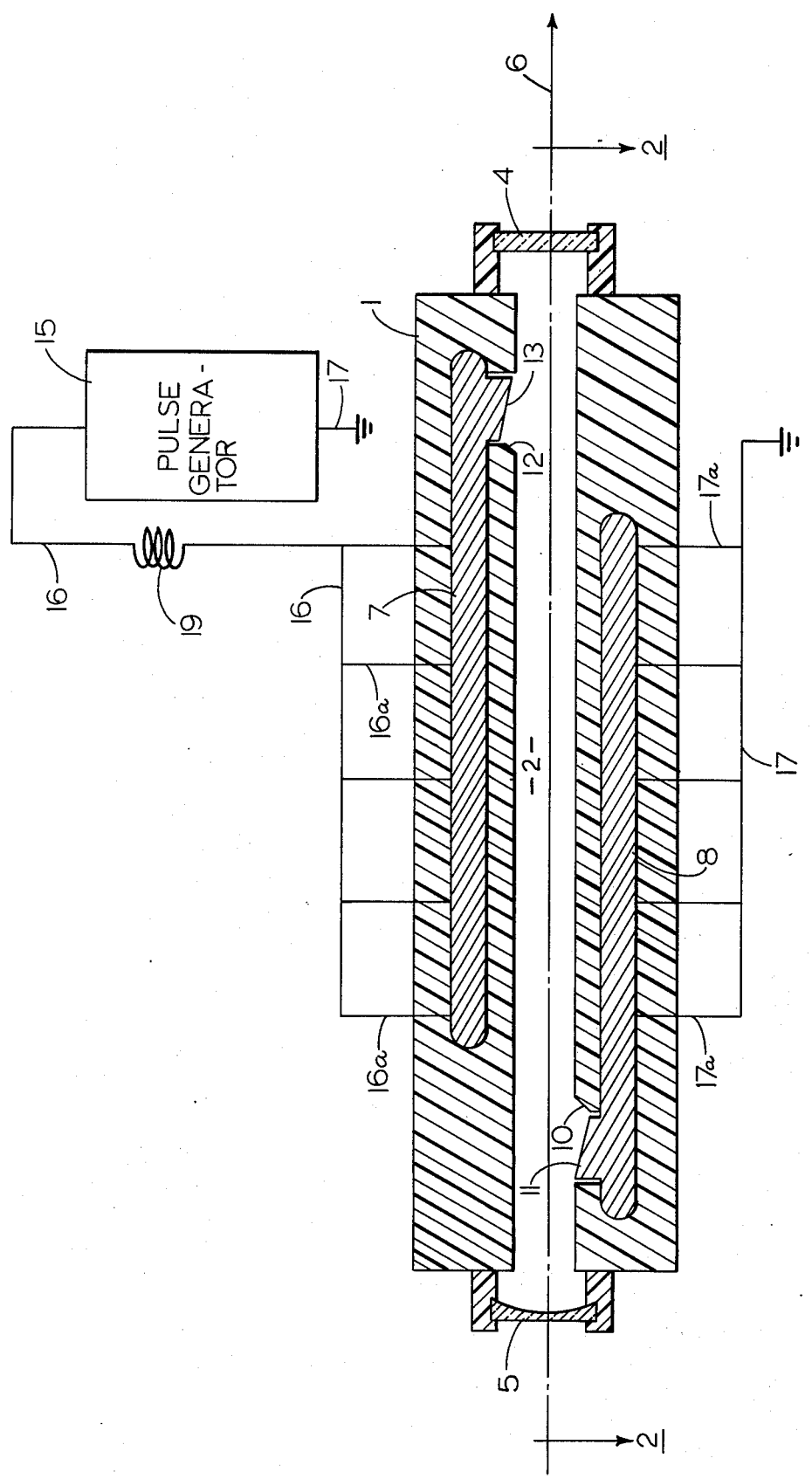
FIG. 1 is a longitudinal section diagram of a gas laser, showing the electrode configuration of the present invention.
Figure 2:
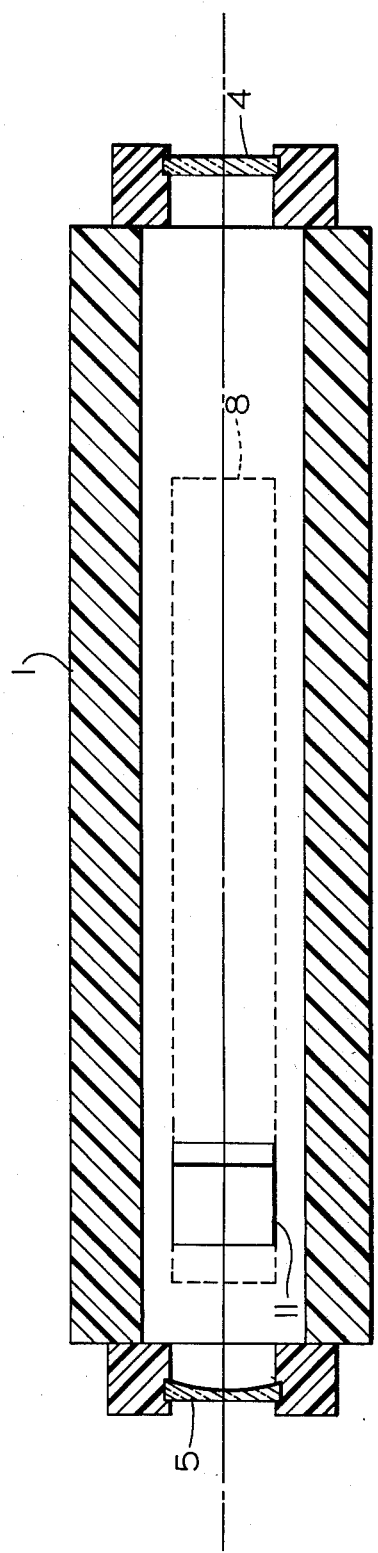
FIG. 2 is a partial sectional view of the laser body, viewed as indicated by line 2—2 in FIG. 1.

Referring to FIGS. 1 and 2, a laser comprises a dielectric body 1 having a central gas volume 2. A partial reflector 4 at one end and a complete reflector 5 at the other end define a laser oscillator cavity for forming a laser beam 6. An anode 7 and a cathode 8 electrode are embedded almost completely in the body 1 extending on opposite sides of the beam center-line. Near one end of body 1, a cathode opening 10 is left in the interior of the body for a cathode projection 11 which is directly exposed to the gas volume. Similarly, near the opposite body end, an anode opening 12 is left in body 1 for an anode projection 13 directly exposed to the gas volume. The projections 11 and 13 are integral portions of the electrodes and preferably extend the full width of the electrodes as shown in FIG. 2, although the relative proportions of elements indicated in the drawings are not to be taken as limiting the dimensions of an actual laser. The gas volume 2 may be about 30 cm long, for example, and this length is about ten times the transverse dimension. The electrodes are also preferably as wide as the gas volume is in this dimension.

As shown in FIG. 1, the anode 7 and cathode 8 may be left short at the end opposite the projection on the other electrode 8 or 7 as the case may be, so that there will be no problem with the projection of one electrode being too close to the embedded end portion of the opposite electrode.

A conventional type high-voltage pulse generator 15 is provided, with the positive end connected electrically to the anode 7 by conductors 16, and the negative end connected electrically to the cathode 8 by ground and further conductors 17. The conductors 16 and 17 preferably have parallel branches 16a and 17a distributed to several locations on the electrode area. An inductance 19 may comprise only the stray inductance of the circuit or a small inductance element can be used, to lengthen the power pulse delivered, if desired. The generator voltage may be $10^5$ to $10^6$ volts, for example.

The present invention is particularly concerned with self-sustained rare-gas halide lasers and other high-pressure gas lasers. Transverse gas flow provisions can be added easily with this illustrated configuration for high pulse repetition rates. This geometry makes it possible to obtain double discharge excitation of the gas with a single power pulse from the pulse generator 15.

This discharge sequence will now be described under separate headings of "Predischarge" and "Main Discharge."

Predischarge.

When the high voltage pulse first appears on the electrodes 7 and 8, an extremely high transverse electric field is created. Initially the field strength through the gas is many time higher than the field in the dielectric body 1 because the gas dielectric constant is generally much lower than that of dielectric material. The high transverse field breaks down the gas very rapidly and creates a very uniform glow throughout the gas since no metallic emitter surfaces are involved. This predischarge pulse is also very short, about five nanoseconds, for example. Transverse current flows through the gas until the dielectric barrier is fully charged, and the transverse field in the gas drops to a low value close to zero.

The possibility of discharge contraction leading to streamer and arc formation is precluded by the fact that the charges on the dielectric surface are immobile. Furthermore, the predischarge pulse length is very short and is determined by the inductance 19 and the stray capacitance of the dielectric between the electrodes (a few pF). Even though the energy deposited in the gas during the predischarge is negligibly small, the power density and ionization levels are high. In fact, the gas excitation is high enough so that lasing threshold may be reached during this predischarge, which means that no energy is wasted in the main pump pulse to establish optical gain.

Main Discharge.

The main, longitudinal, discharge automatically follows the transverse predischarge as soon as the gas becomes sufficiently ionized to support the large longitudinal pump current between the electrode projections 11 and 13. This occurs in approximately five nanoseconds. Since the gas has been very uniformly preionized, the longitudinal discharge will also be very uniform throughout the discharge volume. No cathode streamers or arcing cut down the glow discharge or lasing until the pump pulse voltage decreases. The main discharge may be 50 to 100 nanoseconds long, for example, depending on what gas is used. Longer pulses may be enabled by incorporating larger inductance 19.

Long time delays of around one microsecond, which are generally used between preionization and discharge pulses in conventional UV preionized TE lasers, are not necessary here since such delays were only required to smooth out an originally nonuniform ionization level by means of charge re-combination. Moreover, the very short time delay is an asset when electronegative gas species are present. In the presence of halogen compounds, for example, free electrons are rapidly lost by electron attachment to form negative ions, so that the preionization becomes significantly less effective if the discharge does not follow immediately after the preionization pulse.

Thus it is seen that a greatly improved method and apparatus is provided for the operation of high-pressure gas lasers. The term "high pressure" is intended to mean from one to around ten atmospheres for instance.

The electrode material may be any metal which is a good electrical conductor. Copper, aluminum, or brass are good, while nickel may be used in the exposed projections 11 and 13 if desired.

The body 1 of the laser cavity can be any suitable insulator with preferably a high dielectric constant and high dielectric strength. A good castable material is epoxy, for example. Ceramic could be used if high heat service is required.

The predischarge and the main discharge are of course energized with a single high-voltage pulse, using only two electrodes, without separate predischarge or delay circuits. The strong, uniform preionization makes it possible to produce uniform glow discharges with a wide range of gas mixtures and pressures. Practically any gases can be used, either in a sealed cavity or using gas flow provisions.

The longitudinal discharge maintains a large discharge impedance (load impedance) which can be more easily matched to the power circuit impedance over a longer time period than in existing TE lasers, thus making for optimum power transfer to the gas.

Figure 3:
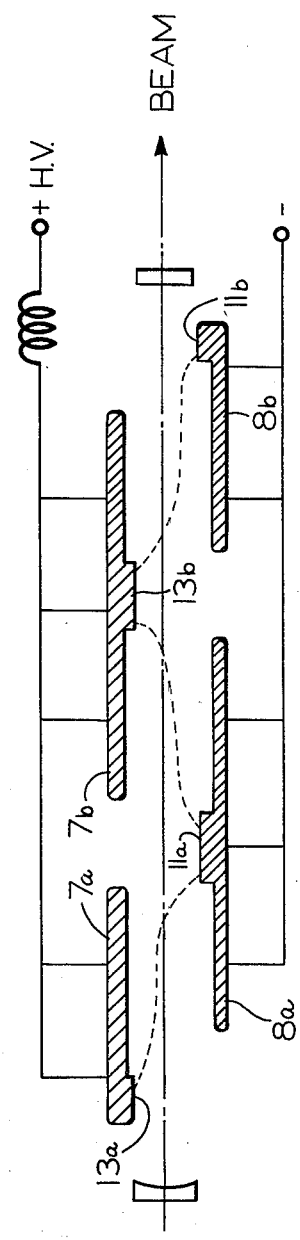
FIG. 3 is a schematic diagram showing an alternate electrode arrangement for use with a low-gain laser medium.

For a low gain laser medium, it may be desirable to increase the gain length without unduly increasing the discharge length and the applied voltage. This can easily be accomplished with the present invention by arranging several discharge sections in series optically but in parallel electrically, as is known for some other lasers. Such an arrangement is diagrammatically shown in FIG. 3. Here, two separated anodes 7a and 7b are provided lengthwise of the laser, on one side of the gas volume, and two separated cathodes 8a and 8b are similarly provided on the opposite side. Anode proejections 13a and 13b and cathode projections 11a and 11b are positioned alternately lengthwise of the cavity, so that there are three longitudinal discharge sections in series with each other. The two anodes 7a and 7b are connected in parallel to the positive terminal of the pulse generator, and the two cathodes 8a and 8b are connected in parallel to the negative terminal of the pulse generator. This principle may be implemented in a number of ways. It will be understood that the electrodes in FIG. 3, with the exception of the projections thereof, are embedded in dielectric body material as taught herein.

While in order to comply with the statute, the invention has been described in language more or less specific as to structural features, it is to be understood that the invention is not limited to the specific features shown, but that the means and construction herein disclosed comprise the preferred mode of putting the invention into effect, and the invention is therefore claimed in any of its forms or modifications within the legitimate and valid scope of the appended claims.

What is claimed is:

1. An electric discharge excited gas laser comprising a gas volume defined by a dielectric body having an elongated open central space, beam-forming reflector means mounted on said body at respective ends of said volume, an elongated cathode electrode and an elongated anode electrode in said body substantially parallel to each other on opposite sides of said gas volume, each said electrode having a projection portion extending from one end thereof toward the opposite side of said gas volume, said projections being at opposite respective longitudinal ends of said gas volume, and said electrodes being embedded in said dielectric body except for having said projections, only, exposed directly to said gas volume, said electrodes forming a transverse predischarge path between the major, embedded, portions of their lengths and a longitudinal main discharge path between said projections.

2. Apparatus in accordance with claim 1 wherein said projections are raised integral portions of said electrodes.

3. Apparatus in accordance with claim 1 wherein said projections extend the full width of their respective electrodes transversely of said gas volume.

4. Apparatus in accordance with claim 1 including high-voltage pulse generating means, and means electrically connecting said pulse generating means across said electrodes.

5. Apparatus in accordance with claim 1 wherein each of said electrodes is left short at the end opposite the said projection on the other electrode, so that there is no electrode material directly opposite either of said projections.

6. Means for sequentially electrically exciting a gas laser, comprising a pair of extended electrodes on opposite sides of the gas cavity in said laser, means for initiating a transverse electric discharge between said electrodes, and means for establishing a longitudinal electric discharge between longitudinally opposite end portions, only, of said electrodes when the gas in said cavity has become ionized by said transverse discharge, said longitudinal discharge-establishing means including a raised projection at one respectively opposite end of each said electrode, said projections extending respectively from said electrodes toward the opposite side of said cavity.

7. Apparatus in accordance with claim 6 wherein said electrodes are enclosed in a dielectric material, and including means defining an opening in said dielectric material around each said projection, whereby said projections are directly exposed to said gas cavity.

8. Apparatus in accordance with claim 6 wherein said discharge means include means for supplying a single high-voltage pulse across said pair of electrodes.

9. Apparatus in accordance with claim 6 wherein said electrodes are enclosed in a dielectric material, including means defining an opening in said dielectric material around each said projection directly exposing said projections to said gas cavity, and wherein said discharge means include means for supplying a single high-voltage pulse across said pair of electrodes.

* * * * *